(12) United States Patent
Luo et al.

(10) Patent No.: US 11,861,008 B2
(45) Date of Patent: *Jan. 2, 2024

(54) USING BROWSER CONTEXT IN EVASIVE WEB-BASED MALWARE DETECTION

(71) Applicant: Palo Alto Networks, Inc., Santa Clara, CA (US)

(72) Inventors: Tongbo Luo, Newark, CA (US); Xin Ouyang, San Jose, CA (US); Zhaoyan Xu, Union City, CA (US); Xing Jin, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,491

(22) Filed: Jul. 21, 2022

(65) Prior Publication Data

US 2022/0358217 A1 Nov. 10, 2022

Related U.S. Application Data

(63) Continuation of application No. 16/927,494, filed on Jul. 13, 2020, now Pat. No. 11,436,329, which is a
(Continued)

(51) Int. Cl.
*G06F 21/00* (2013.01)
*G06F 21/56* (2013.01)
(Continued)

(52) U.S. Cl.
CPC ........ *G06F 21/566* (2013.01); *G06F 9/45558* (2013.01); *G06F 9/547* (2013.01);
(Continued)

(58) Field of Classification Search
CPC .. G06F 21/566; G06F 16/955; G06F 9/45558; G06F 9/547; G06F 21/564; H04L 67/02
See application file for complete search history.

(56) References Cited

U.S. PATENT DOCUMENTS 8,015,284 B1 9/2011 Isenberg
8,087,080 B1 * 12/2011 Wan .................. G06F 21/51
726/25

(Continued)

OTHER PUBLICATIONS

Amrutkar et al., "Detecting Mobile Malicious Webpages in Real Time", IEEE Transactions on Mobile Computing, vol. 16, No. 8, Aug. 2017.*

(Continued)

*Primary Examiner* — Morshed Mehedi
(74) *Attorney, Agent, or Firm* — Van Pelt, Yi & James LLP (57) ABSTRACT

The use of browser context in detecting malware is disclosed. A client device requests content from a remote server. Data received by the client device from the remote server is transmitted to an external scanner for analysis by the external scanner. The external scanner is configured to use a browser executed in an instrumented virtual machine environment to analyze the data provided by the client device. The client device is configured to request the content from the remote server using a browser extension configured to retrieve data and provide the retrieved data to the external scanner without rendering the retrieved data.

20 Claims, 6 Drawing Sheets

Related U.S. Application Data continuation of application No. 15/705,799, filed on Sep. 15, 2017, now Pat. No. 10,747,881.

(51) Int. Cl.
   *G06F 9/54*     (2006.01)
   *G06F 9/455*    (2018.01)
   *G06F 16/955*   (2019.01)
   *H04L 67/02*    (2022.01)

(52) U.S. Cl.
   CPC .......... *G06F 16/955* (2019.01); *G06F 21/564* (2013.01); *H04L 67/02* (2013.01)

(56) References Cited

U.S. PATENT DOCUMENTS

| | | | |
|---|---|---|---|
| 8,127,358 | B1 | 2/2012 | Lee |
| 9,444,831 | B1* | 9/2016 | Lee ................ H04L 63/1416 |
| 9,665,714 | B1* | 5/2017 | Vlaznev ............ G06F 21/552 |
| 9,716,701 | B1 | 7/2017 | Wang |
| 2005/0005107 | A1 | 1/2005 | Touboul |
| 2005/0283835 | A1* | 12/2005 | Lalonde ............ G06F 21/563 |
| | | | 713/188 |
| 2007/0074169 | A1 | 3/2007 | Chess |
| 2007/0143271 | A1 | 6/2007 | Yuval |
| 2007/0294373 | A1 | 12/2007 | Harrison |
| 2010/0318681 | A1 | 12/2010 | Shi |
| 2011/0307955 | A1* | 12/2011 | Kaplan ............... G06F 21/56 |
| | | | 726/23 |
| 2012/0272320 | A1 | 10/2012 | Rados |
| 2013/0097666 | A1 | 4/2013 | Wu |
| 2014/0283078 | A1* | 9/2014 | Redfoot ............ H04L 63/0245 |
| | | | 726/23 |
| 2015/0156183 | A1 | 6/2015 | Beyer |
| 2015/0379273 | A1* | 12/2015 | Chess ................ G06F 21/52 |
| | | | 726/25 |
| 2017/0372070 | A1 | 12/2017 | Burdett |

OTHER PUBLICATIONS

Argyros et al., "SFADiff: Automated Evasion Attacks and Fingerprinting Using Black-box Differential Automata Learning", CCS, 2016.

Barua et al., Server Side Detection of Content Sniffing Attacks, 2011 22nd IEEE International Symposium on Software Reliability Engineering, Nov. 29-Dec. 2, 2011.

Du et al., "Position paper: why are there so many vulnerabilities in web applications?", In Proceedings of the 2011 New Security Paradigms Workshop (NSPW '11). ACM, New York, NY, USA, 83-94. 2011.

Eshete et al., "EKHunter: A Counter-Offensive Toolkit for Exploit Kit Infiltration", NDSS, Feb. 2015.

Eshete et al., "WebWinnow: leveraging exploit kit workflows to detect malicious urls". In Proceedings of the 4th ACM conference on Data and application security and privacy (CODASPY '14). ACM, New York, NY, USA, 305-312. 2014.

Grier et al., "Manufacturing compromise: the emergence of exploit-as-a-service". In Proceedings of the 2012 ACM conference on Computer and communications security (CCS '12). ACM, New York, NY, USA, 821-832. 2012.

Hirotomo et al., "Efficient Method for Analyzing Malicious Websites by Using Multi-Environment Analysis System," 2017 12th Asia Joint Conference on Information Security (AsiaJCIS), Seoul, pp. 48-54. 2017.

Hu et al., "JSForce: A Forced Execution Engine for Malicious JavaScript Detection", Jan. 2017.

Jin et al., "Code injection attacks on HTML5-based mobile apps", 2014.

Kolbitsch et al., "Rozzle: De-Cloaking Internet Malware", IEEE Symposium on Security and Privacy, San Francisco, CA, pp. 443-457, 2012.

Kreguel et al., Service Specific Anomaly Detection for Network Intrusion Detection, SAC 02, Proceedings of the 2002 ACM Symposium on Applied Computing, Madrid, Spain, Mar. 11-14, 2002.

Lee et al., "Warningbird: Detecting Suspicious URLs in Twitter Stream", NDSS, 2012.

Lee et al., Stealing Webpages Rendered on your Browser by Exploiting GPU Vulnerabilities, 2014 IEEE Symposium on Security and Privacy, Date of Conference, May 18-21, 2014.

Leontiadis et al., "A Nearly Four-Year Longitudinal Study of Search-Engine Poisoning", CCS, 2014.

Li et al., "Hunting the Red Fox Online: Understanding and Detection of Mass Redirect-Script Injections", 2014.

Lu et al., "Weaknesses in Defenses Against Web-Borne Malware", 2013.

Luo et al., "Attacks on WebView in the Android system". In Proceedings of the 27th Annual Computer Security Applications Conference (ACSAC '11). ACM, New York, NY, USA, 343-352. 2011.

Luo et al., "Contego: capability-based access control for web browsers". In International Conference on Trust and Trustworthy Computing (pp. 231-238). Springer, Berlin, Heidelberg. Jun. 2011.

Luo et al., "Touchjacking attacks on web in android, ios, and windows phone". In International Symposium on Foundations and Practice of Security (pp. 227-243). Springer, Berlin, Heidelberg. Oct. 2012.

Min et al., "A simple and novel technique for counteracting exploit kits". In International Conference on Security and Privacy in Communication Systems (pp. 259-277). Springer, Cham. Sep. 2014.

Rajab et al., "Trends in Circumventing Web-Malware Detection", Google Technical Report, Jul. 2011.

Saxena et al., "A Symbolic Execution Framework for JavaScript", 2010.

Shin et al., "EFFORT: Efficient and effective bot malware detection," 2012 Proceedings IEEE INFOCOM, Orlando, FL, pp. 2846-2850. 2012.

Stock et al., "Kizzle: A signature compiler for exploit kits". In International Conference on Dependable Systems and Networks (DSN). Feb. 2015.

Tan et al., "SCUTA: a server-side access control system for web applications". In Proceedings of the 17th ACM symposium on Access Control Models and Technologies (SACMAT '12). ACM, New York, NY, USA, 71-82. 2012.

Wu et al., "Cloaking and Redirection: A Preliminary Study", AIRWeb, 2005.

Wu et al., "Detecting Semantic Cloaking on the Web", WWW, Proceedings of the 15th international conference on World Wide Web pp. 819-828, Edinburgh, Scotland—May 23-26, 2006.

Yang et al., "Droidminer: Automated mining and characterization of fine-grained malicious behaviors in android applications", In European symposium on research in computer security (pp. 163-182). Springer, Cham. Sep. 2014.

\* cited by examiner

USING BROWSER CONTEXT IN EVASIVE WEB-BASED MALWARE DETECTION

CROSS REFERENCE TO OTHER APPLICATIONS

This application is a continuation of U.S. patent application Ser. No. 16/927,494 entitled USING BROWSER CONTEXT IN EVASIVE WEB-BASED MALWARE DETECTION filed Jul. 13, 2020, which is a continuation of U.S. patent application Ser. No. 15/705,799, now U.S. Pat. No. 10,747,881, entitled USING BROWSER CONTEXT IN EVASIVE WEB-BASED MALWARE DETECTION filed Sep. 15, 2017, each of which is incorporated herein by reference for all purposes.

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or computer network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Environment Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices, and in various implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform a variety of operations (e.g., firewall, anti-malware, intrusion prevention/detection, Data Loss Prevention (DLP), and/or other security functions), networking functions (e.g., routing, proxy, Quality of Service (QoS), workload balancing of network related resources, and/or other networking functions), and/or other functions. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Figure 1:
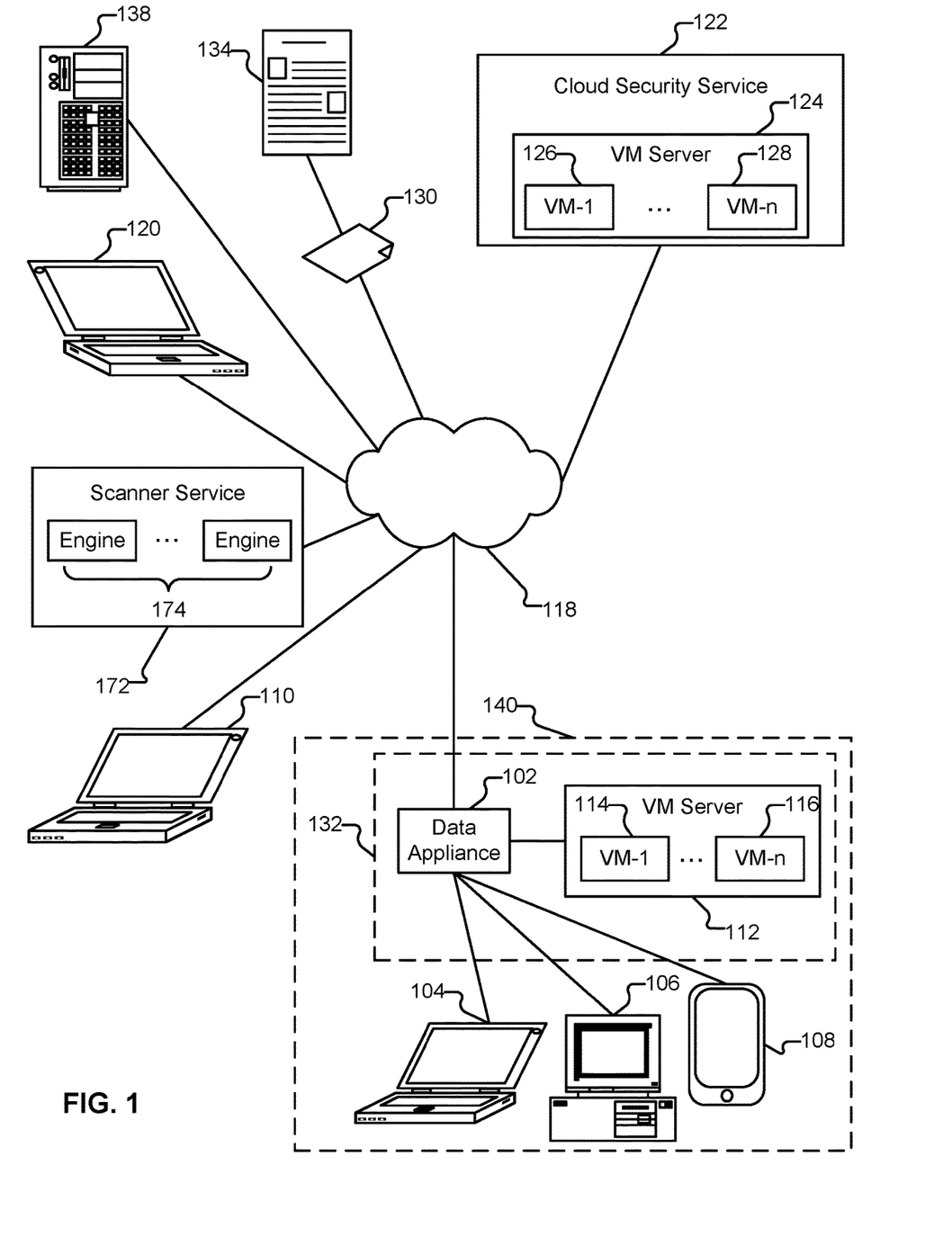
FIG. 1 illustrates an example of an environment in which malicious applications ("malware") are detected and prevented from causing harm.

FIG. 1 illustrates an example of an environment in which malicious applications ("malware") are detected and prevented from causing harm. As will be described in more detail below, malware classifications (e.g., as made by cloud security service 122) can be variously shared and/or refined among various entities included in the environment shown in FIG. 1. And, using techniques described herein, devices, such as endpoint client devices 104-110 can be protected from such malware.

In the example shown in FIG. 1, client devices 104, 106, and 108 are a laptop computer, a desktop computer, and a tablet (respectively) present in an enterprise network 140. Also included in FIG. 1 is a client device 110 outside enterprise network 140 (e.g., a laptop owned by an individual).

Data appliance 102 is configured to enforce policies regarding communications between clients, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads (e.g., URLs), files exchanged through instant messaging programs, and/or other file transfers. In some embodiments, data appliance 102 is also configured to enforce policies with respect to traffic that stays within enterprise network 140.

Figure 2:
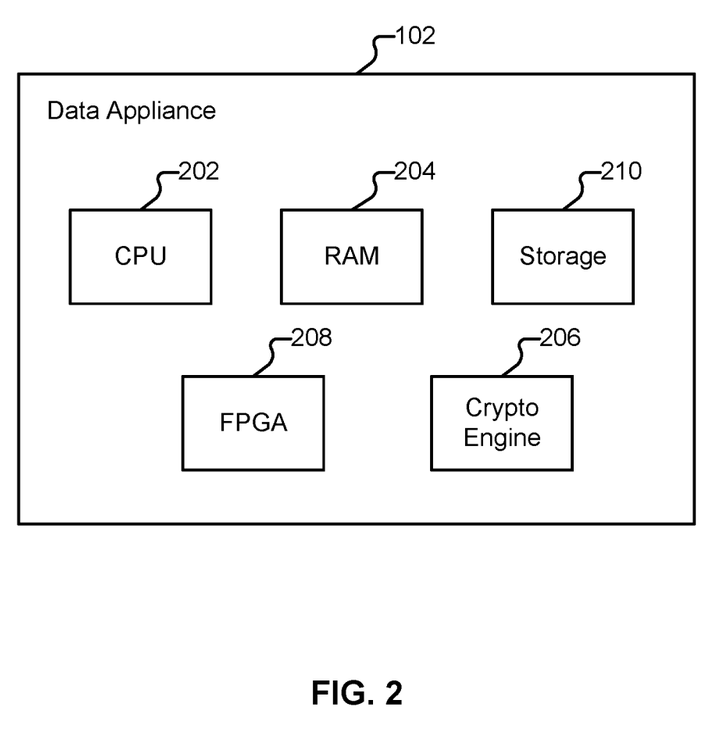
FIG. 2 illustrates an embodiment of a data appliance.

An embodiment of a data appliance is shown in FIG. 2. The example shown is a representation of physical components that are included in data appliance 102, in various embodiments. Specifically, data appliance 102 includes a high performance multi-core CPU 202 and RAM 204. Data appliance 102 also includes a storage 210 (such as one or more hard disks), which is used to store policy and other configuration information, such as Uniform Resource Locator (URL) categorization information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Data appliance 102 can take a variety of forms. For example, data appliance 102 can be a single, dedicated device (e.g., as shown), and can also be a set of devices. The functionality provided by data appliance 102 can also be integrated into or executed as software on a general purpose computer, a computer server, a gateway, and/or a network/routing device. For example, in some embodiments, services provided by data appliance 102 are instead (or in addition) provided at least partially to client device 104 (and/or client devices 106 and 108) by an agent or other software executing on client device 104 (and/or client devices 106 and 108).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be added to data appliance 102 as applicable.

Data appliance 102 can be configured to work in cooperation with one or more virtual machine servers (e.g., 112 and 124) to perform malware analysis/prevention, including various techniques for performing dynamic malware analysis of URL samples using a browser executed in an instrumented virtual machine (VM) environment. As one example, data appliance 102 can be configured to provide a URL sample to one or more of the virtual machine servers for real-time analysis (e.g., dynamic analysis using an instrumented VM environment). As another example, cloud security service 122 can provide a list of signatures of known-malicious URLs to appliance 102 as part of a subscription. Those signatures can be generated by cloud security service 122 in conjunction with the techniques described herein. For example, if cloud security service 122 determines that a URL sample is malicious, cloud security service 122 can automatically generate a signature for the URL and send the new signature to various subscribers. Data appliance 102 and various other data appliances (e.g., data appliances 136 and 148) can receive subscription-based signature updates that can then be applied by the data appliance(s) to block and/or perform other actions for network traffic associated with any such malware URLs based on a policy, such as a firewall policy.

The malware analysis and enforcement functionality illustrated in FIG. 1 as being provided by data appliance 102 and VM server 112 is also referred to herein as being provided by malware analysis system 132. Portions of malware analysis system 132 may be provided by multiple distinct devices, but may also be provided on a single platform, as applicable. For example, in some embodiments, techniques described herein are performed wholly by a VM server (e.g., by VM server 112 or 124). In other embodiments, such techniques are performed at least in part by a data appliance, such as data appliance 102. And, in yet other embodiments, such techniques are performed completely by a data appliance.

An example of a virtual machine server is a physical machine comprising commercially available server-class hardware (e.g., a multi-core processor such as a dual 6-core Intel® processor with Hyper-Threading, 4 or more Gigabytes of RAM such as a 128 GB RAM, a system disk such as a 120 GB SSD, and one or more Gigabit network interface adapters) that executes commercially available virtualization software, such as VMware ESXi, Citrix XenServer, or Microsoft Hyper-V (e.g., such a VM environment can emulate the Windows® XP operating system environment using the dual 6-core Intel® processor with Hyper-Threading and 512 MB of RAM, the Windows® 7 operating system environment using the dual 6-core Intel® processor with Hyper-Threading and 1 GB of RAM, and/or other operating system environments and/or using different hardware capacity/components). The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to data appliance 102 via cloud security service 122). In some embodiments, data appliance 102 is configured to use one or the other of virtual machine servers 112 and 124 for dynamic malware analysis. In other embodiments, data appliance 102 is configured to use the services of both servers (and/or additional servers not shown).

In various embodiments, virtual machine server 124 is configured to implement various emulation-based techniques for performing dynamic malware analysis of a URL (e.g., URL samples) using a browser executed in an instrumented virtual machine environment (e.g., implemented using instrumented VM environments 126 and 128, which can be executed by cloud security service 122 and/or malware analysis system 132). These instrumented virtual machine environments can include, for example, various user level hooks and/or kernel level hooks in the emulated execution environment (e.g., using various user level and/or kernel level hooks for monitoring behaviors of programs executing, such as a browser program, and/or monitoring various network activities) to facilitate the monitoring of various program behaviors (e.g., active/executable content included in a resource accessible via a URL, such as JavaScript code that is embedded in a web page of the URL or linked from the URL) during execution in the virtual environment (e.g., instrumented VM environments, such as described above) and to log such monitored program behaviors for analysis based on the various techniques described herein with respect to various embodiments. Also, in some cases, multiple instances of a URL sample are performed using multiple VM environments to perform various tests and/or execute using different execution environments (e.g., different versions of an operating system (OS) environment, different versions of an application, for example, different versions of a browser such as Microsoft Internet Explorer 9, Microsoft Internet Explorer 10, Microsoft Internet Explorer 11, etc.).

Applying Instrumented Virtual Machines to Analyze URL Samples

An instrumented virtual machine environment can be used to perform behavior profiling (e.g., in a VM sandbox environment) using various heuristic-based analysis techniques that can be performed during execution of the program in the instrumented VM environment (e.g., in some cases, in real-time during execution of the program in the instrumented VM environment), such as during a file transfer (e.g., during an active file/attachment download, such as downloading and rendering a web page based on a URL sample) and/or on files previously collected (e.g., a collection of files submitted for batch analysis). Documents, executables, and other forms of potentially malicious content (e.g., to be evaluated) are referred to herein as "malware samples" or just "samples." URL samples generally refer to candidate malware samples that include a URL address and can generally be rendered using a browser (e.g., a web browser, such as Microsoft Internet Explorer and/or other web browsers).

In various embodiments, virtual machine server 124 (and/or virtual machine server 112, as applicable) is configured to execute a browser that can be used to request and render a URL in one or more virtual machines, such as virtual machine environments 126 and 128 (e.g., instantiated virtual machines in the instrumented virtual machine environment). The virtual machines may all execute the same operating system (e.g., Microsoft Windows Version 7, Version 8, Version 10, and/or other versions of the Microsoft operating system) or may execute different operating systems or versions thereof (e.g., with VM environment 126 emulating an Android operating system or some other operating system). Observed behaviors resulting from executing a browser and rendering the URL sample (e.g., to analyze various behaviors while rendering the URL sample using the browser in the instrumented VM environment) are logged and analyzed for indications that the URL is potentially malicious or malicious. For example, if an attempt to retrieve known malware is detected, then the URL sample can be determined to be malicious. As another example, if certain behaviors are detected (e.g., attempts to access sensitive local files), then the URL sample can be determined to be malicious based on various heuristic techniques.

If the URL sample (e.g., embedded URLs, active/executable or other content associated with the resource accessible via the URL of the URL sample) is determined to be malicious, data appliance 102 can automatically block the URL request/web page download based on the analysis result. Further, in some embodiments, a signature can be generated and distributed (e.g., to data appliance 102 and/or other data appliances) to automatically block future URL requests determined to be malicious (e.g., to block known malware URLs).

In an example implementation, various system (e.g., operating system) and browser events can be detected (e.g., intercepted) in the instrumented VM environment that can facilitate various techniques as further described below. For example, various functions and/or events can be detected (e.g., registered for notifications using message hooks) in the instrumented VM environment. JavaScript and/or browser related events can be enumerated on JavaScript HTML Document Object Model (DOM) nodes (e.g., by accessing an unknown structure in system memory). Using these example approaches and various other approaches further described below, the content (e.g., HTML source code, JavaScript code, and/or other content, including dynamic content) of a URL sample (e.g., web page) can be identified and recorded.

Figure 3:
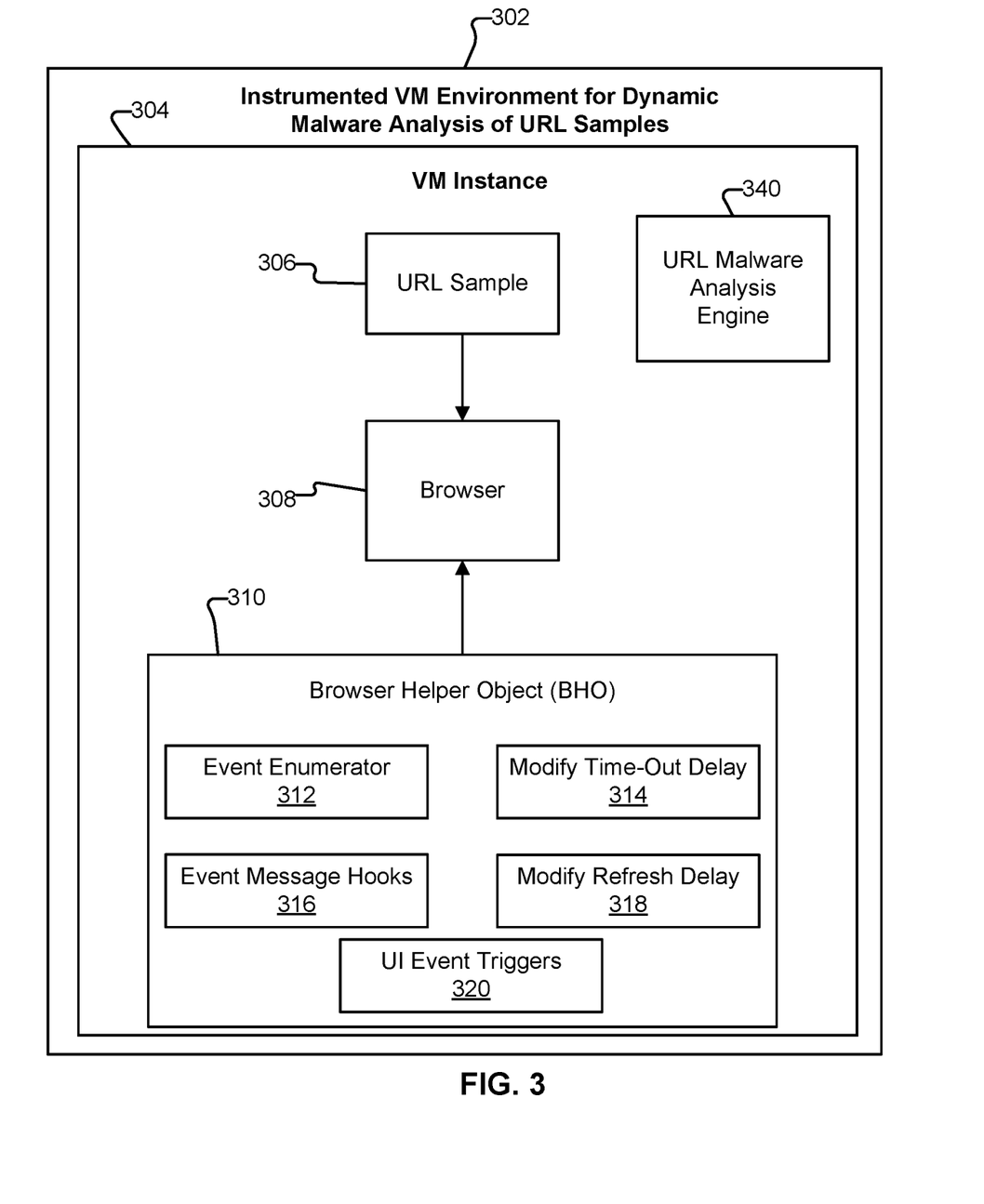
FIG. 3 illustrates an example of an instrumented virtual machine environment.

FIG. 3 is a functional diagram of an instrumented virtual machine environment in accordance with some embodiments. As shown in FIG. 3, VM environment 302 includes one or more VM instances, such as a VM instance 304. In various embodiments, instrumented VM environment 302 is executed on VM server 112 of malware analysis system 132 and/or on VM server 124 of cloud security service 122. One or more URL samples can be provided to the instrumented VM environment for dynamic malware analysis of URL samples. URL malware analysis engine 340 performs various malware analysis techniques to determine whether the URL sample is associated with malware. For example, URL malware analysis engine 340 can perform various heuristic and/or other malware detection techniques, based on various kernel-level and/or user-level hooks to monitor behaviors of the browser during execution/rendering of the URL sample.

In the example shown in FIG. 3, a URL sample 306 is provided to a browser 308 (e.g., Microsoft Internet Explorer or another web browser) executed in VM instance 304. A browser helper object (BHO) 310 is loaded by browser 308 and executed before the URL sample is processed (e.g., prior to retrieving and rendering HTML and executing JavaScript code associated with the sample URL) by browser 308. In an example implementation, BHO 310 is a JavaScript dynamically loaded library (DLL) module that is implemented as a standard plugin module for the Microsoft Internet Explorer browser to perform added functionality. BHO 310 can include a variety of components for performing various functions as further described below.

In some embodiments, BHO 310 includes an event enumerator component 312. Event enumerator 312 can process the URL sample to enumerate each of the events (e.g., JavaScript events and/or other events). One approach to such enumeration is for event enumerator 312 to use JavaScript HTML Document Object Model (DOM) nodes that can be performed by the rendered URL (e.g., by accessing a structure in system memory).

In some embodiments, BHO 310 also includes a modify time-out delay component 314. Attackers can use a SetTimeOut function to attempt to delay execution of content (e.g., JavaScript code or other content) of a web page to avoid detection in a typical VM analysis environment (e.g., by having such execution delayed until some period of time that is longer than a typical time period allocated for malware analysis in the VM analysis environment). Modify time-out delay 314 can modify a SetTimeOut function in JavaScript code of the URL sample to be a shorter delay, such as to be only a one second delay or some other value. In an example implementation, modify time-out delay component 314 is implemented by modifying (e.g., at run-time) the JavaScript SetTimeOut function to reduce the parameter setting for that time for sleep/delay (e.g., to replace the SetTimeOut function parameter from, for example, five minutes of sleep/delay to one second to speed up operation).

In some embodiments, BHO 310 also includes an event message hooks component 316. Event message hooks component 316 can hook one or more different types of events that are associated with the URL sample (e.g., included in the enumerated events described herein). As one example, a message hook can be registered for an onload finish event such that a message notification is generated for an onload finish event in the JavaScript code of the URL sample (e.g., the message notification is sent after the function(s) that is called after the onload event has completed execution, and thus, dynamic execution and rendering of the content of the URL sample has completed). In this example, the message hook provides a message notification when the onload finish event is completed.

In some embodiments, BHO 310 also includes a modify refresh delay component 318. Attackers can use a refresh event/function to attempt to delay a refresh of a web page to avoid detection in a typical VM analysis environment (e.g., by having the refresh delayed until some period of time that is longer than a typical time period allocated for malware analysis in the VM analysis environment). Modify refresh delay 318 can modify a refresh event associated with the URL sample to reduce the parameter setting for that time before the refresh is executed (e.g., to replace the refresh function parameter from, for example, five minutes of delay to one second to speed up operation).

In some embodiments, BHO 310 also includes a UI event triggers component 320. Attackers can use UI event triggers to attempt to avoid execution of content (e.g., JavaScript code or other content) of a web page if and until one or more UI event triggers are received to avoid detection in a typical VM analysis environment (e.g., by having the execution delayed if and until one or more UI event triggers are received, which would not be received in a typical VM analysis environment as there is no actual user interaction in such an emulated VM environment). UI event triggers 320 can automatically generate such UI event triggers to trigger execution of all content (e.g., triggering execution of all of the functions in the JavaScript code by directly calling such functions associated with such UI events and/or simulating such UI events so that the browser calls such functions) of the web page. In an example implementation, user interface (UI) event triggers 320 can hook one or more different types of events that are associated with the URL sample (e.g., included in the enumerated events as described above). For example, one or more functions in JavaScript code associated with the URL sample that are triggered in response to one or more UI events can be directly called to be executed without delay to facilitate an enhanced dynamic malware analysis of the URL sample in an efficient period of time. Example UI events include OnClick, OnMouseMove, OnKeyDown, OnKeyUp, and/or various other UI events. This technique facilitates detection of malware executed after such UI events that would otherwise not be detected in a typical VM environment.

Overview of Exploit Kits

One way malware is propagated is through the use of an exploit kit. An exploit kit is software (e.g., a collection of PHP scripts) that is deployed on a web server and targets security problems in commonly installed client software on visitor devices (e.g., Adobe Flash, Oracle Java, and Apple Quicktime). An example of an exploit kit is MPack. Exploit kits are often modular in nature, allowing an adversary to add new vulnerabilities as they are discovered, and remove old vulnerabilities (e.g., once most devices become immune to such vulnerabilities, such as through patching).

When a client device interacts with a web server upon which an exploit kit is present, components of the exploit kit identify one or more exploits potentially applicable to that client device (e.g., by determining what software is installed on the client device). The exploit kit transmits corresponding malware that employs such exploits to the client (e.g., via a drive-by download) and causes the malware to execute on the device.

Returning to the environment of FIG. 1, suppose that a nefarious individual, hereinafter referred to as "Eve" (using laptop 120) wishes to compromise client devices. One approach is for Eve to operate a website, such as website 138, and install an exploit kit upon it. Eve can lure visitors by making content available on website 138 such as pirated videos/music, or pornography. As the visitors interact with website 138 (e.g., by clicking on advertising, or otherwise interacting with dynamic components of the site), they will be compromised by the exploit kit (based on attacks customized to their respective client devices/installed software).

Some drawbacks to this first approach (from Eve's viewpoint as an attacker) are that setting up and maintaining a website such as website 138 can be time-consuming and expensive, and can also possibly make Eve traceable (e.g., due to biographical information/billing information potentially being exposed in operating the website infrastructure). Another drawback is that content that will be desirable to unsuspecting victims (e.g., free music and/or pornography) is also the sort of content that is likely to be filtered, e.g., by a corporate firewall, endpoint protection software, etc. Accordingly, potential visitors to Eve's malicious website may be blocked due to the nature of the content she is providing as a lure (e.g., pornography).

A second approach Eve can take is to compromise a third party's website (e.g., website 134) and install an exploit kit there (e.g., without the knowledge of the website's owner). Each of the drawbacks of the first approach is absent if Eve uses this second, parasitic approach. When locating websites to compromise, common targets include personal blogs, recipe sites, etc., typically implemented using content management system software (e.g., a PHP-based software package). Such sites are often created by well-intentioned individuals who unfortunately lack the appropriate technical skills to harden/maintain such sites (e.g., by performing regular software updates, turning off unnecessary features, etc.). Further, the native content on such sites is likely to appear innocuous (e.g., stories about vacation/travel, tips for cooking, etc.), meaning a traditional content filter (e.g., prohibiting access to pornographic websites) will likely not include rules blocking access to such sites.

Suppose laptop 110 is owned by Bob, a fly fishing enthusiast. Further suppose that website 134 is a popular forum among fishermen, where individuals like Bob exchange photos of their work, and post messages. Eve becomes aware of security vulnerabilities in website 134 (e.g., by using a search tool that enumerates the IP addresses of servers vulnerable to a particular exploit). Eve uses those vulnerabilities to gain access to website 134 and install an exploit kit on it. Users of website 134, such as Bob, can be compromised by the exploit kit in a variety of ways. As one example, a login, or other script/form, with which Bob interacts whenever he visits website 134 could be compromised by the exploit kit. In this approach, when Bob clicks on a "submit" button or similar interactive element, the exploit kit could facilitate the downloading of malicious content (e.g., malware 130) to Bob's client device 110. Another approach is for Eve to compromise advertisements served by website 134, triggering malicious behavior when users click on the advertisements (whether by compromising website 134, or, in an alternate scenario, compromising a third-party advertising service which serves website 134 with ads).

Also depicted in FIG. 1 is a third-party scanner service 172. Third-party scanner service 172 (an example of which is VirusTotal) includes the malware analysis engines (174) of a variety of third party security vendors. One service provided by third-party scanner service 172 is an interface into which individuals can enter URLs and receive back results that indicate, for each of the engines 174, whether or not the URL is considered to be malicious.

As an attacker, Eve would like her compromise of website 134 to remain undetected by third-party scanner service 172 (and the engines from which verdicts are obtained). Accordingly, her exploit kit makes use of a set of cloaking techniques. A goal of such techniques is to ensure that only benign content is served to web crawlers, malware detection systems, etc., so that such systems will generate a false negative when examining site 134. Malicious content is served only to the compromisable systems of individuals such as Bob (e.g., laptop 110).

One example of a cloaking technique is a server-side cloaking technique. In an example of this approach, Eve can "blacklist" the IP addresses of known security infrastructure (e.g., IP addresses/ranges used by engines 174; by cloud security service 122; by data appliances 102, 136, 148; and by corresponding infrastructure provided by other security vendors (e.g., not pictured in FIG. 1)). Here the term "blacklist" is used in quotes, because rather than blocking nodes on the list from accessing website 134 (as a blacklist might typically be used), Eve wants to ensure that those nodes are served only benign content (and will form verdicts that website 134 is safe). HTTP header information can also be used in server-side cloaking (e.g., using the user-agent string to identify automated scanners and serve them benign content).

A second example of a cloaking technique is a client-side cloaking technique. Here, the exploit kit uses a piece of JavaScript or other code (often highly obfuscated) embedded on a landing page of site 134 to obtain information from the client (e.g., device 110) about its environment. The collected information can be used in a variety of ways. In one example, the exploit kit can determine whether the client device has loaded images that are included on the landing page. If the client device has not loaded the images, this is an indication that the client device is a crawler/scanner (configured to conserve bandwidth by not loading images) and only benign content should be served to it. In another example, the exploit kit determines whether a particular piece of software is installed on the client (and if so, its version number). If an exploitable piece of software is installed on the client device, the device can be redirected to a page containing malicious code associated with the exploit. If no such exploitable software is advertised by the client device as being installed, no redirection takes place (and only benign content is served).

Other evasion approaches can be used by Eve to help keep website 134 from being identified as malicious, in addition to/instead of the cloaking techniques described above. For example, Eve can make use of fast-flux domains. As another example, the environmental checks described above can be limited by the exploit kit to testing for a single vulnerability at a time (e.g., a particular version of a particular browser). A series of multiple redirects can be used, e.g., with each page load testing for a new vulnerability and two redirection paths available based on the result (vulnerable vs. not). Redirection continues until a vulnerability is found for the client (and the client is redirected to malicious content), or terminated (e.g., due to no vulnerabilities being found, or a determination being made that the client is a scanner) at which point benign content can be provided by website 134 to the client. Nonetheless, and as will be described in more detail below, website 134 can be identified as malicious using techniques described herein.

Using Browser Context in Evasive Web-Based Malware Detection

Figure 4:
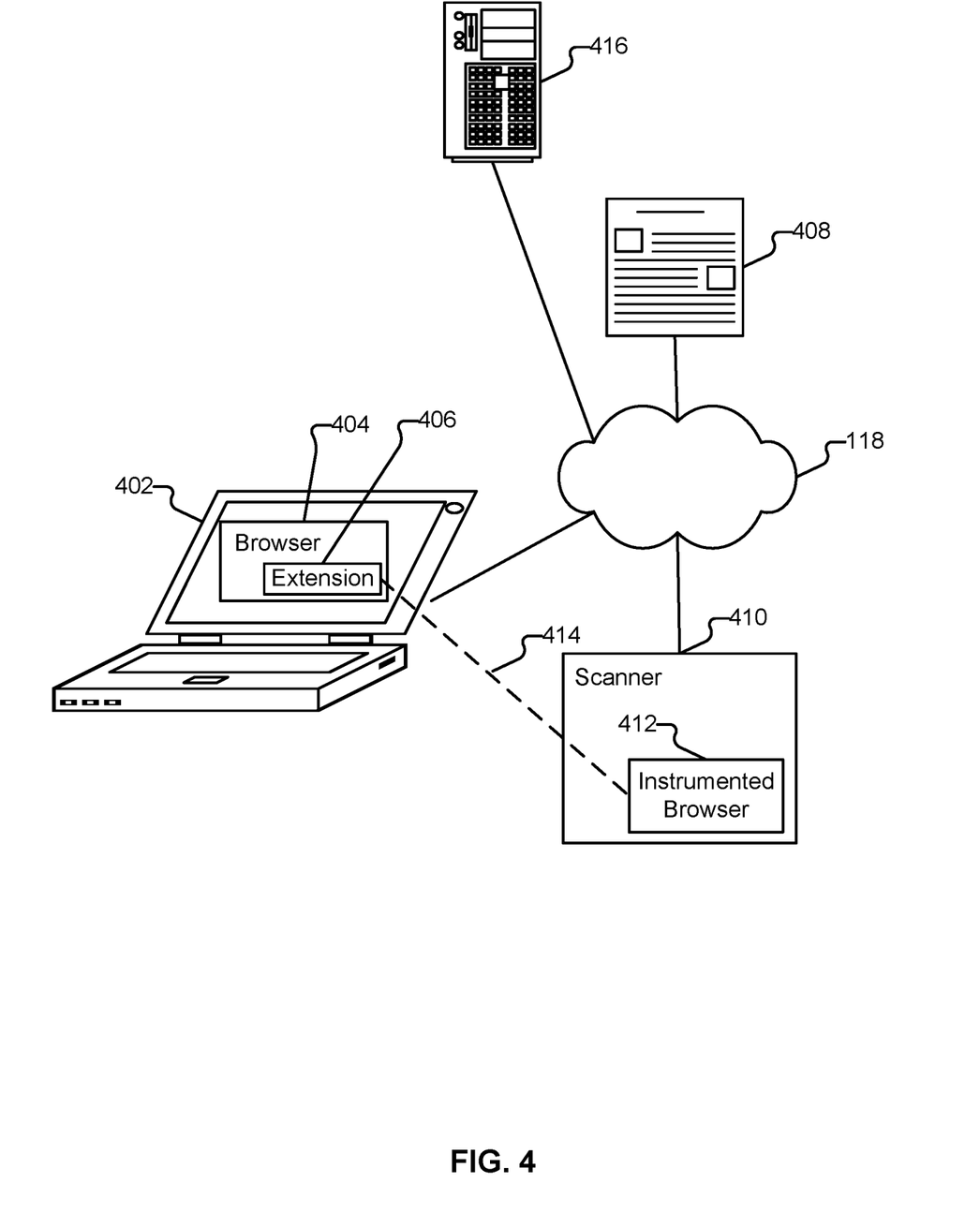
FIG. 4 illustrates an example of a hybrid scanning environment, in which a client device and a remote device coordinate to determine whether web content is malicious.

FIG. 4 illustrates an example of a hybrid scanning environment, in which a client component and a remote scanner component cooperate to determine whether web content is malicious. Client device 402 has installed on it a standard web browser application 404 (e.g., Google Chrome). Browser extension 406 (e.g., a Chrome extension, written in JavaScript and/or another appropriate scripting language) is also installed, and provides browser 404 with additional functionality, described in more detail below.

Suppose a user of client device 402 (hereinafter referred to as "Alice") would like to access content on website 408. When she launches browser 404, extension 406 is automatically loaded. Extension 406 establishes a socket connection to scanner 410 (e.g., via one or more networks 118). Scanner 410 is listening on a port or set of ports for such incoming connections. A script (e.g., a python script) on scanner 410 is executed in response to the connection from extension 406, and initiates an instrumented browser environment 412.

Alice types the URL for site 408 into her browser, indicating that she would like to visit the page. In some embodiments, all URLs provided by Alice (whether by her typing them in, or by her interacting with the browser (e.g., clicking on links)) are processed using the hybrid scanning techniques described herein. In other embodiments, only those URLs which Alice indicates she would like to have checked are processed by the hybrid scanning techniques (e.g., by Alice typing the URL into a dedicated search bar, or otherwise interacting with a custom user interface element provided by extension 406, such as a context menu item). As applicable, filtering can be performed on the URLs (e.g., to automatically allow access to high traffic known good sites, and/or to automatically block access to known malware sites, e.g., in accordance with whitelists and blacklists made available by cloud security service 122, and only process those URLs not appearing on a white/blacklist). Such filtering can be performed by extension 406, by scanner 410, and/or other components (e.g., not pictured).

Extension 406 contacts site 408 and receives data (e.g., HTML, and JavaScript) in response to the request for the landing page. Instead of executing/rendering the received data at client device 402, extension 406 provides the received data to scanner 410 (e.g., via the open socket connection). Scanner 410 executes/renders the received data using a browser executed in the instrumented virtual machine environment (412). The data provided by client device 402 to scanner 410 may reference images, external JavaScript code, iframe elements, etc., which may require additional contact with site 408 to process/execute. Further, in some cases, several steps may be needed to reach the malicious content from the URL provided by the user. One example of this is a long redirect chain from the landing page of the website to the landing page of the exploit. In various embodiments, the instrumented virtual machine environment is configured to hook every API that may load remote web content (e.g., iframe content, plugins, and page navigation), so that the process to load remote content can be interrupted and client device 402 can be made to fetch the data. In particular, scanner 410 can use extension 406 as a proxy to fetch any additional data needed in connection with rendering/executing the data in environment 412. The proxying performed by client device 402 on behalf of scanner 410 is depicted in FIG. 4 as a dashed line (414).

Suppose that the landing page of website 408 has been compromised with an exploit that makes use of both server-side and client-side cloaking techniques. If scanner 410 were to contact website 408 directly (using instrumented browser 412), web site 408 might be able to determine (e.g., through scanner 410's IP address) that scanner 410 is a malware scanner, and only provide benign content to scanner 410 in response. The analysis performed in the instrumented virtual machine environment could then erroneously conclude that site 408 is benign.

In the example environment of FIG. 4, however, client device 402 and its browser are exchanging data with website 408, and scanner 410 is not interacting with website 408. Accordingly, website 408 will see client device 402's IP as the source of the request, not scanner 410's. And, contextual information about browser 404 (e.g., which particular version of Chrome is installed on client device 402) and client device 402 itself (e.g., which other versions of other software are installed) will be obtained by website 408, not the contextual information of instrumented virtual machine environment 412. From Alice's perspective, it will be very difficult to distinguish requests made by a victim like Bob (via client device 110) from requests made by Alice's client device (on behalf of scanner 410).

As mentioned above, while browser 404/extension 406 communicate with website 408, they do not execute/render any of the content that website 408 provides. Execution/ rendering is performed within the instrumented virtual machine environment (412) where a maliciousness verdict can be determined. Accordingly, in the event website 408 transmits malicious JavaScript (or other code) to client device 402, client device 402 will be protected. Instead, when such malware is received by client 402, it will be provided to scanner 410 by client device 402. Scanner 410 (e.g., using static/dynamic analysis techniques described above) will be able to identify that website 408 has provided client 402 with malware and can form a verdict about website 408 (e.g., malicious), accordingly.

Figure 5:
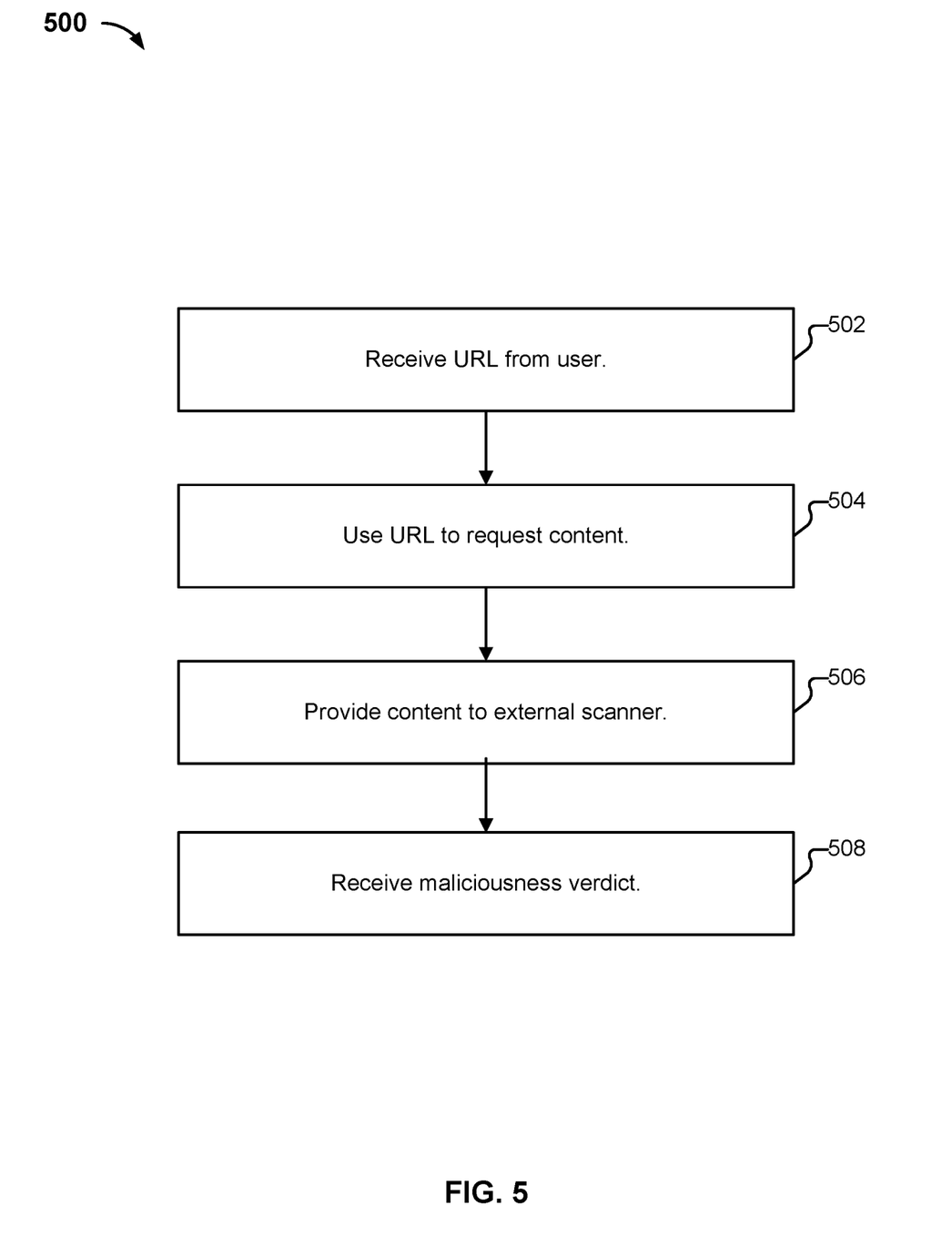
FIG. 5 illustrates an example of a process for detecting malware.

FIG. 5 illustrates an example of a process for detecting malware. In various embodiments, process 500 is performed on a client device, an example of which is client device 402. Other examples of client devices which can perform process 500 (e.g., after installation of an appropriate browser extension) include clients 104-110. The process begins at 502 when a URL is received from a user. As previously explained, the URL can be received a variety of ways. As one example, all URLs that a user (e.g., Alice) attempts to access via browser 404 can be provided to extension 406 (received at 502). A subset of URLs can also be received, for example, with a designated search area into which Alice can type URLs she finds suspicious.

At 504, the URL is used to request content. As one example, at 504, browser extension 406 contacts website 408 (via the URL) and fetches content as if browser 404 was going to render the content. However, instead of rendering the received content, at 506, client device 402 transmits the received content (or at least a portion thereof) to scanner 410 (e.g., using a socket connection).

Finally, at 508, a maliciousness verdict is received (e.g., from scanner 410). If the verdict is "malicious," further communication between client device 402 and website 408 can be terminated. If the verdict is "benign," browser 404 can be instructed (e.g., by extension 406) to commence interacting with website 408 in a typical manner (e.g., to render received content) and extension 406 can stop providing content to scanner 410. In various embodiments, the socket connection remains open whenever browser 404/ extension 406 are executing. In other embodiments, the socket connection is opened and closed on demand (e.g., whenever extension 406 is performing portions of process 500).

Figure 6:
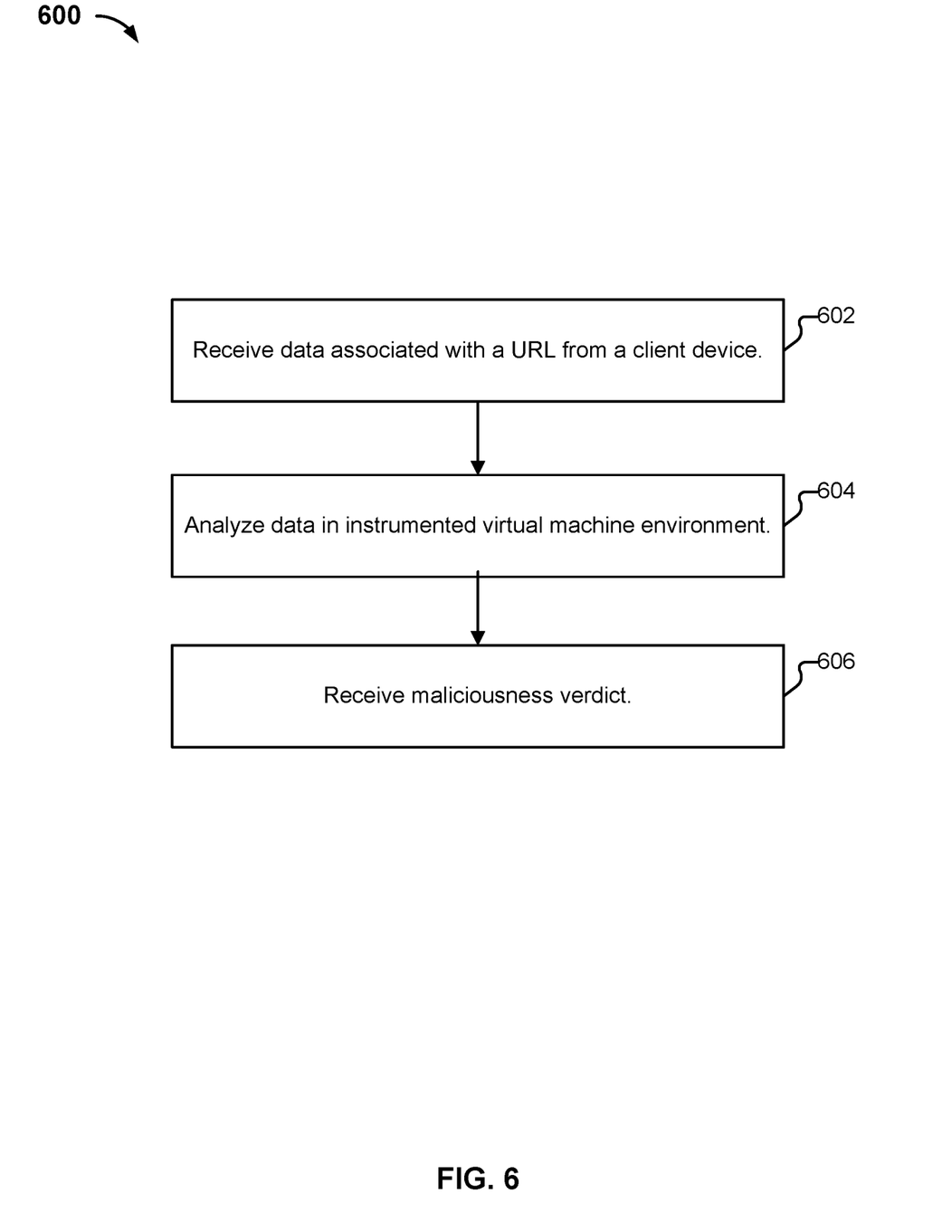
FIG. 6 illustrates an example of a process for detecting malware.

FIG. 6 illustrates an example of a process for detecting malware. In various embodiments, process 600 is performed on a scanner, an example of which is scanner 410. Other examples of scanners which can perform process 600 include VM server 124, VM server 112 (or a subcomponent thereof), scanner service 172, and one or more engines 174. In particular, engines 174 (even if authored by vendors other than a vendor of scanner 410) can readily be adapted, as applicable, to use techniques described herein, with minimal code changes (e.g., by customizing proxying as described herein and leaving the engines' respective detection heuristics/functionality unchanged). Other architectures can also be used in conjunction with process 600. For example, client device 402 can be in communication with multiple scanners 410 at once. As another example, scanner 410 may include multiple instrumented browser environments (e.g., each with its own socket connection to a different client device).

The process begins at 602 when data is received from a client device. As one example, the data received at 602 is provided by client device 402 to scanner 410 (and is received by client device 402 when browser extension 406 contacts website 408). At 604, the received data is analyzed in an instrumented virtual machine environment. As one example, an instrumented browser executes/renders the data received at 602. If, while executing/rendering the received data, additional data is required (e.g., rendering an element requires additional data from website 408 or server 416), scanner 410 can request the data using proxy 414. Specifically, browser 404/extension 406 will contact website 408 (and/or server 416 as applicable) to fetch additional data on behalf of scanner 410. Multiple such iterations of proxying/ fetching can be performed as needed, until scanner 410 has evaluated enough data in conjunction with website 408 to form a maliciousness verdict (and/or until a threshold has been reached, such as a maximum amount of time scanner 410 will attempt to ascertain whether site 408 is malicious).

At 606, a maliciousness verdict is determined for the URL (e.g., based on the analysis performed at 604). Examples of verdicts include "benign," "malicious," and "undetermined" (e.g., where analysis terminates before a verdict of benign/ malicious is reached).

The maliciousness verdict can be used in a variety of ways and provided to a variety of entities. As one example, the verdict can be provided by scanner 410 to client 402, which can then take an appropriate action (e.g., indicating to Alice that it is safe to interact with website 408, and allowing browser 404 to commence rendering/executing traffic received from website 408; or, indicating to Alice that website 408 is malicious and preventing further access to the site). As another example, scanner 410 can report its verdict to scanner service 172 (whether scanner 410 is implemented as one of scanner service 172's engines 174, or is a standalone or other server). As yet another example, scanner 410 can report its verdict to cloud security service 122, which can in turn make the verdict available (e.g., as part of the infrastructure described above) to data appliances 102, 136, and 148.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
   a processor configured to:
      request, at a client device, and from a remote server, content;
      transmit to an external scanner for analysis by the external scanner, data received by the client device from the remote server in response to the request for the content, wherein the external scanner is configured to use a browser executed in an instrumented virtual machine environment to analyze the data provided by the client device, and wherein the client device is configured to request the content from the remote server using a browser extension configured to retrieve data and provide the retrieved data to the external scanner without rendering the retrieved data; and
      receive, at the client device, a maliciousness verdict from the external scanner, and only in the event the maliciousness verdict is benign, allow the client device to render the content from the remote server at the client device; and
   a memory coupled to the processor and configured to provide the processor with instructions.

2. The system of claim 1, wherein the processor is further configured to receive, from the external scanner, a request that the client device obtain additional data from the remote server.

3. The system of claim 1, wherein the client device is further configured to act as a proxy on behalf of the external scanner.

4. The system of claim 1, wherein, in response to receiving the maliciousness verdict, the processor is further configured to store the maliciousness verdict on the client device.

5. A method, comprising:
   requesting, at a client device, and from a remote server, content;
   transmitting to an external scanner for analysis by the external scanner, data received by the client device from the remote server in response to the request for the content, wherein the external scanner is configured to use a browser executed in an instrumented virtual machine environment to analyze the data provided by the client device, and wherein the client device is configured to request the content from the remote server using a browser extension configured to retrieve data and provide the retrieved data to the external scanner without rendering the retrieved data; and
   receiving, at the client device, a maliciousness verdict from the external scanner, and only in the event the maliciousness verdict is benign, allowing the client device to render the content from the remote server at the client device.

6. The method of claim 5, further comprising receiving, from the external scanner, a request that the client device obtain additional data from the remote server.

7. The method of claim 5, wherein the client device is further configured to act as a proxy on behalf of the external scanner.

8. The method of claim 5, further comprising, in response to receiving the maliciousness verdict, storing the maliciousness verdict on the client device.

9. A system, comprising:
   a processor configured to:
      receive, at an external scanner, from a client device, data received by the client device from a remote server and in response to a request for content made by the client device to the remote server, wherein the client device is configured to retrieve data and provide the retrieved data to the external scanner without rendering the retrieved data;
      analyze the received data using a browser executed in an instrumented virtual machine environment;
      determine a maliciousness verdict for the analyzed data; and
      provide the maliciousness verdict to the client device; and
   a memory communication interface coupled to the processor and configured to provide the processor with instructions.

10. The system of claim 9, wherein the processor is further configured to request, from the client device, additional data from the remote server.

11. The system of claim 10, wherein the processor is configured to use the client device as a proxy to request the additional data.

12. The system of claim 9, wherein analyzing the received data includes determining whether additional remote web content is needed to render a page.

13. The system of claim 9, wherein the instrumented virtual machine environment is configured to hook every API that can load remote web content.

14. The system of claim 13, wherein the processor is configured to interrupt an attempt to load the remote web content so that the remote web content is requested from the client device.

15. A method, comprising:
   receiving, at an external scanner, from a client device, data received by the client device from a remote server and in response to a request for content made by the client device to the remote server, wherein the client device is configured to retrieve data and provide the retrieved data to the external scanner without rendering the retrieved data;
   analyzing the received data using a browser executed in an instrumented virtual machine environment;
   determining a maliciousness verdict for the analyzed data; and
   providing the maliciousness verdict to the client device.

16. The method of claim 15, further comprising requesting, from the client device, additional data from the remote server.

17. The method of claim 16, further comprising using the client device as a proxy to request the additional data.

18. The method of claim 15, wherein analyzing the received data includes determining whether additional remote web content is needed to render a page.

19. The method of claim 15, wherein the instrumented virtual machine environment is configured to hook every API that can load remote web content.

20. The method of claim 19, further comprising interrupting an attempt to load the remote web content so that the remote web content is requested from the client device.

* * * * *